United States Patent [19]

Moon

[11] Patent Number: 5,606,370
[45] Date of Patent: Feb. 25, 1997

[54] SYNC RESTORING METHOD FOR VARIABLE-LENGTH DECODING AND APPARATUS THEREOF

[75] Inventor: Heon-hee Moon, Suwon-city, Rep. of Korea

[73] Assignee: Samsung Electronics Co., Ltd., Kyungki-do, Rep. of Korea

[21] Appl. No.: 499,900

[22] Filed: Jul. 11, 1995

[30] Foreign Application Priority Data

Jul. 11, 1994 [KR] Rep. of Korea ............... 94-16620

[51] Int. Cl.⁶ ..................................... H04N 7/26
[52] U.S. Cl. ................................ 348/390; 348/423
[58] Field of Search ........................... 348/390, 423, 348/718; 358/336; H04N 7/26

[56] References Cited

U.S. PATENT DOCUMENTS 5,280,349  1/1994  Wang .............................. 348/390
5,493,414  2/1996  Inoue ............................. 358/336

*Primary Examiner*—Howard W. Britton
*Attorney, Agent, or Firm*—Sughrue, Mion, Zinn, Macpeak & Seas

[57] ABSTRACT

A sync restoring apparatus includes a first-in-first-out (FIFO) memory for storing the variable-length-coded data and sequentially outputting a predetermined number of bits of data according to a read signal, a decoder for variable-length-decoding the applied data, outputting the block end signal obtained by the decoding operation, and generating a data request signal every time the number of bits of data used in the decoding operation becomes a predetermined number of bits, an error detector for generating an error signal when the number of the block end signals which are not decoded at the exact variable-length-decoding time is not less than a predetermined limit value based on the data format, and an interfacer coupled to transmit the data applied from the FIFO memory according to the read signal, and if the error signal is not generated in the error detector, generating a read signal according to the data request signal generated from the variable-length-decoder, while if the error signal is generated in the error detector, generating read signals until error-detected second block data is wholly read from the FIFO memory, independently of the data request signal, and a controller for controlling the decoder so as to stop the decoding operation when the error signal output from the error detector is applied to the controller, while when the second block data is supplied to the decoder, the decoding operation is performed.

6 Claims, 4 Drawing Sheets

SYNC RESTORING METHOD FOR VARIABLE-LENGTH DECODING AND APPARATUS THEREOF

BACKGROUND OF THE INVENTION

1. Field of the Invention

The present invention relates to variable-length decoding technology, and more particularly to a sync restoring method and apparatus capable of maintaining synchronization for processing a signal in a variable-length decoder, even when a transmission error is generated in variable-length-coded digital data.

2. Description of Related Art

A variable-length coding (VLC) method is representative of a lossless coding method, and is widely used in combination with a coding method which uses a discrete cosine transform method or a differential pulse code modulation method in connection with an image signal coding technology. Such a VLC method assigns a short codeword to a frequently occurring symbol while assigning a longer codeword to an infrequently occurring symbol, thereby lowering total data transmission rate. Such a method is generally used in an image coding method such as an MPEG (Moving Picture Experts Group) system using ISO/CCITT Standards, or a high-definition television (HDTV) system developed in the U.S.A. A general VLC and variable-length decoding (VLD) method is disclosed in the following papers 1) "An Entropy Coding System for Digital HDTV Application" by Shaw-Min Lei and. Ming-Ting Sun (IEEE Transactions on Circuit & Systems for Video Technology, vol. No. 1, March 1991), and 2) "VLSI Architecture & Implementation of a Circuits & Systems" by Ming-ting Sun (Singapore, pp 200–203, May, 1991).

A variable-length coder of an image signal generates a VLC codeword in correspondence to a run-level pair which is generated using a general zigzag scan. Here, the run-level pair is composed of a run-length representing the number of sequential "0s" and a level which is not zero, as is well known. The VLC codewords generated by the variable-length coder are multiplexed with various headers and other parity information to form a sequential bitstream. The sequential bitstream received at a decoder is segmented as a predetermined size, for example, 24 bits to be written in a first-in-first-out (FIFO) memory. The variable-length-decoder reads a predetermined number of bits of data from the FIFO memory to perform a variable-length-decoding, and determines whether the predetermined number of the following bits of data is read on the basis of the number of bits of which the variable-length-decoding has been completed. In more detail, the variable-length-decoder sequentially detects a run-length pair corresponding to the VLC codeword among the read bits, and outputs "0s" according to the run-length of the detected run-length pair, to then output a level. Also, the variable-length-decoder reads new data having a predetermined number of bits from the FIFO memory when the number of the variable-length-decoded bits becomes equal to a predetermined number of bits. In this case, the bitstream includes the VLC codewords having variable lengths, with the number of the variable-length-decoded bits being continuously varied. In other words, since each boundary between the VLC codewords cannot be predicted during a variable-length-decoding process, a length of the VLC codeword to be currently decoded cannot be exactly determined until the previous VLC codeword has been decoded. For this reason, the variable-length-decoder is able to precisely decode the following VLC codeword on the basis of the number of bits of the current decoded VLC codeword, only after the current VLC codeword is decoded. Therefore, when the bitstream includes a transmission error, the variable-length-decoder performs a decoding operation by using an incorrect VLC codeword with respect to the error-generated portion. Accordingly, an incorrect decoding operation is continuously performed after that. Such a misoperation can cause an abnormal operation when data is read from the FIFO memory, with a result that the variable-length-decoder does not accomplish synchronization for decoding input data.

SUMMARY OF THE INVENTION

Therefore, to solve the above problems, it is an object of the present invention to provide a sync restoring method in which a transmission error is detected to enable a normal variable-length-decoding operation on the basis of the detected result after a predetermined time has elapsed.

It is another object of the present invention to provide a sync restoring apparatus for allowing a normal variable-length-decoding operation on the basis of detection of a transmission error after a predetermined time has elapsed.

To accomplish the above object of the present invention, there is provided a sync restoring method for an apparatus for storing variable-length-coded data on the basis of a data format including a block end signal representing a first block having a respectively predetermined magnitude and a second block larger than the first block, and decoding data supplied from a first-in-first-out (FIFO) memory which sequentially outputs a predetermined number of bits of data from firstly stored data every time a read signal is applied to the FIFO memory, the sync restoring method comprising the steps of:

(a) variable-length-decoding the applied data, outputting the block end signal obtained by the variable-length-decoding operation, and generating a data request signal every time when the number of bits of the data used in the variable-length-decoding operation becomes a predetermined number of bits;

(b) judging whether the block end signal output from step (a) is decoded at an exact variable-length-decoding time based on the data format;

(c) generating an error signal when the number of the block end signals which are not decoded at the exact variable-length-decoding time obtained by the judged result of step (b) is equal to or larger than a predetermined limit value;

(d) if the error signal is not generated in step (c), generating a read signal according to the data request signal generated in step (a);

(e) if the error signal is generated in step (c), generating read signals until error-detected second block data is wholly read from the FIFO memory, independently of the data request signal; and (f) controlling step (a) so that the second block data corresponding to the error signal of step (c) is not variable-length-decoded by step (a) and the second block data following the error-detected second block is variable-length-decoded.

To accomplish the above other object of the present invention, there is provided a sync restoring apparatus for receiving variable-length-coded data on the basis of a data format including a block end signal representing a first block having a predetermined magnitude and a second block larger than the first block, and variable-length-decoding the received data, the sync restoring apparatus comprising:

a first-in-first-out (FIFO) memory for storing the received variable-length-coded data and sequentially outputting a predetermined number of bits of data from firstly stored data every time a read signal is applied to the FIFO memory;

a variable-length-decoder for variable-length-decoding the applied data, outputting the block end signal obtained by the variable-length-decoding operation, and generating a data request signal every time when the number of bits of the data used in the variable-length-decoding operation becomes a predetermined number of bits;

an error detector for judging whether the block end signal output from the variable-length-decoder is decoded at an exact variable-length-decoding time based on the data format, and generating an error signal when the number of the block end signals which are not decoded at the exact variable-length-decoding time obtained by the judged result is equal to or larger than a predetermined limit value;

an interfacer coupled to transmit the data applied from the FIFO memory according to the read signal, and if the error signal is not generated in the error detector, generating a read signal according to the data request signal generated from the variable-length-decoder, while if the error signal is generated in the error detector, generating read signals until error-detected second block data is wholly read from the FIFO memory, independently of the data request signal; and a controller for controlling the variable-length-decoder so as to stop the decoding operation of the variable-length-decoder when the error signal output from the error detector is applied to the controller, while when the second block data following the error-detected second block is supplied to the variable-length-decoder, the decoding operation is performed.

BRIEF DESCRIPTION OF THE DRAWINGS

The preferred embodiments are described with reference to the drawings wherein.

DETAILED DESCRIPTION OF THE PREFERRED EMBODIMENT

A preferred embodiment of the present invention will be described below in more detail with reference to the accompanying drawings.

There are a source coding method and an entropy coding method as general image coding technologies. The source coding method uses redundancy inherent to an image signal to digitally compress the image signal, which uses a DCT, a subband DPCM, a quantization method, etc. The entropy coding method further compresses the data compressed by the source coding method according to a statistical probability of occurrence. The variable-length-decoding method is a representative method of a lossless coding method, which has been described above. Due to the large number of data to be processed, a digital advanced TV (ATV) system uses two such coding methods, dividing a picture screen into several windows and processing the divided picture. An example of this system is shown in FIGS. 1 and 2.

Figure 1:
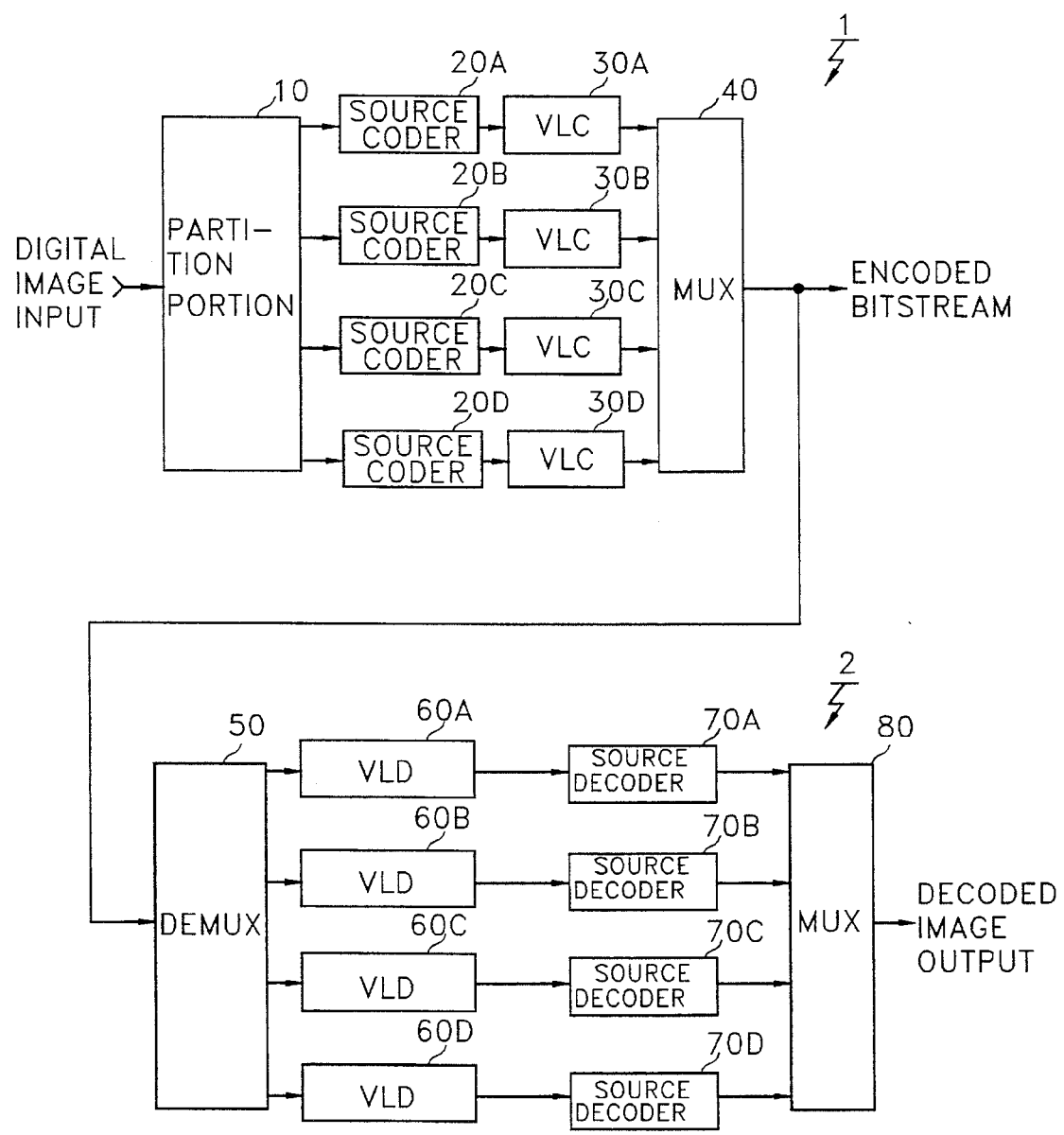
FIG. 1 is a schematic block diagram of an encoding and decoding apparatus for a general digital system.

FIG. 1 is a schematic block diagram of a general digital system having an apparatus for encoding and decoding digital data. In FIG. 1, digital image input is segmented in a partitioner 10 of an encoder 1 and input to respective source coders 20A through 20D. The outputs of respective source coders 20A through 20D are input to a multiplexer 40 via variable-length-coders 30A through 30D, respectively. Multiplexer 40 multiplexes the respectively coded window data into a single bitstream and then transmits the multiplexed data to a decoder 2. Since the amount of bits generated in each window can be different from each other, multiplexer 40 inserts overhead data into the bitstream to discriminate the respective window data, and then transmits the inserted data to decoder 2. The bitstream transmitted in this manner is again separated into four windows and then input to the respective variable-length-decoders 60A through 60D. The signal decoded by respective variable-length-decoders 60A through 60D is again decoded in source decoders 70A through 70D. Thereafter, the decoded signal is multiplexed in a multiplexer 80 and outputted as a decoded image.

Figure 2:
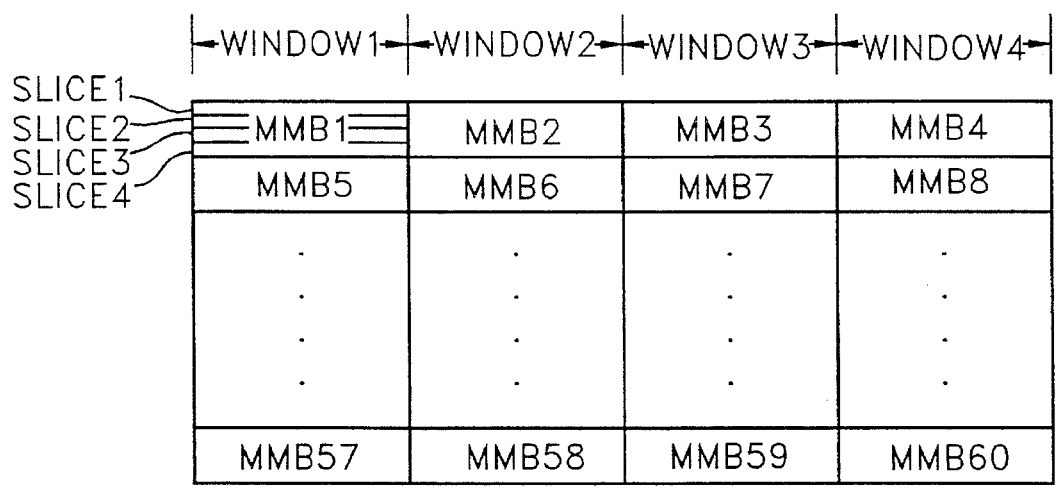
FIG. 2 is a view of a general data processing format according to digital data windows.

FIG. 2 shows a case where one picture is divided into four windows. One window is composed of fifteen masses of macroblocks (MMB). One MMB is composed of four slices. One slice is composed of a plurality of macroblocks. When the FIG. 1 system uses a data structure shown in FIG. 2, encoder 1 multiplexes the data belonging to four windows in sequence of MMB1, MMB2, MMB3, MMB4, MMB5, . . . , MMB60, and transmits the multiplexed data. Decoder 2 inversely multiplexes the MMBs in such a sequence. Then, the MMBs in the first window are processed by source coder 20A, variable-length-coder 30A, variable-length-decoder 60A and source decoder 70A, and the MMBs in the second window are processed by source coder 20B, variable-length-coder 30B, variable-length-decoder 60B and source decoder 70B. The MMBs in the remaining windows are processed in the same way as the above first and second windows.

On the other hand, since the amount of data generated in each window is not constant, a bit stuffing operation is performed in the end portion of the MMB, so that the amount of data of each MMB becomes a multiple of the number of the bits (for example, 24 bits) written in the FIFO memory at a time. Also, to prevent an underflow due to a small amount of generated data, there is a bit stuffing operation for inserting predetermined data. In this embodiment, a predetermined number of bits having a value of "0" is inserted in the end portion of the MMB. Since the bit stuffing for a variable-length-decoding operation is a known technology that a person skilled in the art can easily design, a portion necessary for using the bit stuffing will be described below in this embodiment.

The present invention provides an apparatus for normally decoding other MMBs following a MMB which contains a transmission error based on an error detection when the variable-length-coded and bit-stuffed bitstream includes the transmission error. An embodiment of the present invention will be described in more detail with reference to FIGS. 3 through 5.

Figure 3:
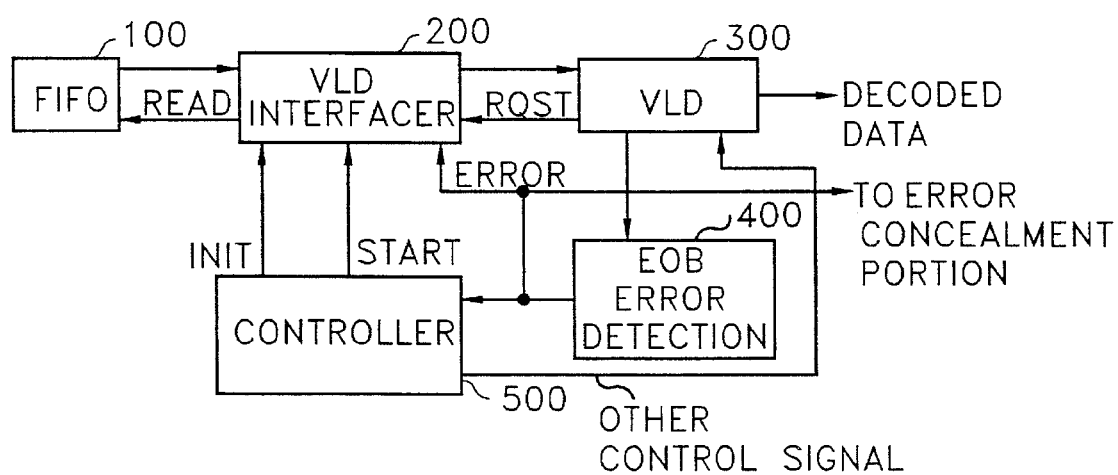
FIG. 3 is a schematic block diagram of a sync restoring apparatus according to the present invention.
Figure 4:
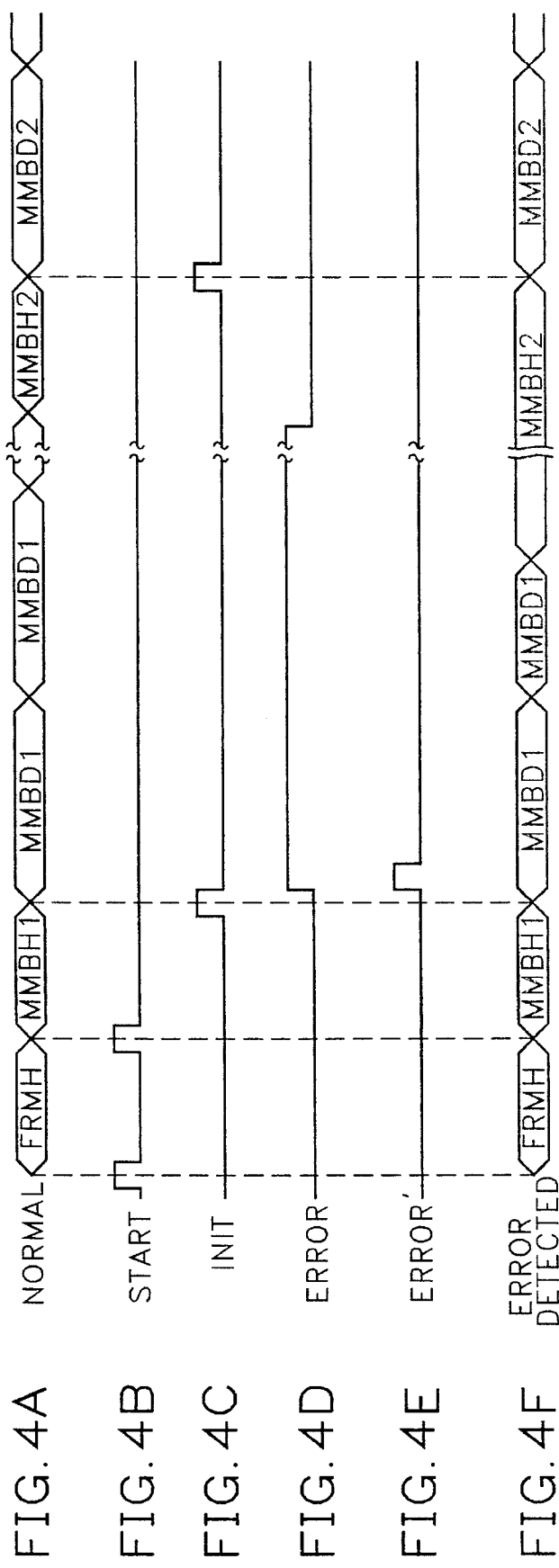
FIGS. 4A through 4F show timing diagrams for explaining a case where an error is generated in transmission of digital data in a sync restoring apparatus according to the present invention.

The FIG. 3 apparatus performs a variable-length-decoding operation based on a constant data format. The bitstream applied to the FIG. 3 apparatus is variable-length-coded and bit-stuffed data based on a constant data format. The bitstream of each image frame produced on the basis of a constant data format is composed of frame head data (FRMH), head data (MMBH1) of MMB1 and information data (MMBD1), and head data MMBH2 and information data MMBD2 in sequence, as shown in FIG. 4A. Frame head data (FRMH) has a 32-bit frame start code (FSC). Head data (MMBH) of each MMB has an MMB start code (MSC). One slice in each MMB within the bitstream has one hundred and ten end-of-blocks (EOBs) codewords. The EOB codeword is concatenated in the rear end of each block of the encoded data. Such a bitstream is written and read in units of 24 bits in and from FIFO memory 100, respectively. Thus, when number of bits of data in each MMB is not a multiple of 24 bits, one through twenty-three bit values of "0" which are bit-stuffed at the end of the MMB. FIFO memory 100 outputs 24-bit data to variable-length-decoding (VLD) interfacer 200 starting from the firstly stored bits whenever a read signal (READ) is applied from VLD interfacer 200. When the FIG. 3 apparatus processes a bitstream having no transmission error, data latched in VLD interfacer 200 is shown in FIG. 4A. When the FIG. 3 apparatus processes a bitstream having a transmission error, data latched in VLD interfacer 200 is shown in FIG. 4F. A data interval represented as a hexagon in FIGS. 4A and 4F means an amount of the data stored in VLD interfacer 200 every three read signals.

The FIG. 3 apparatus processes the bitstream having no transmission error, controller 500 generates a start signal (START) and an initialization signal (INIT) based on the above-described data format. Controller 500 generates a control signal for enabling operation of variable-length-decoder 300 and generates the other control signal and supplies the generated control signals to variable-length-decoder 300. VLD interfacer 200 generates a read signal (READ) according to the signals START and INIT supplied from controller 500. VLD interfacer 200 varies the interval at which read signal READ is generated according to whether or not a data request signal RQST generated by the operation of variable-length-decoder 300 and an error signal (ERROR) supplied from an error detector 400 are applied thereto. VLD interfacer 200 supplies the data supplied from FIFO memory 100 to variable-length-decoder 300 as well. The operation of the VLD interfacer 200 will be described below in more detail with reference to FIG. 5.

Figure 5:
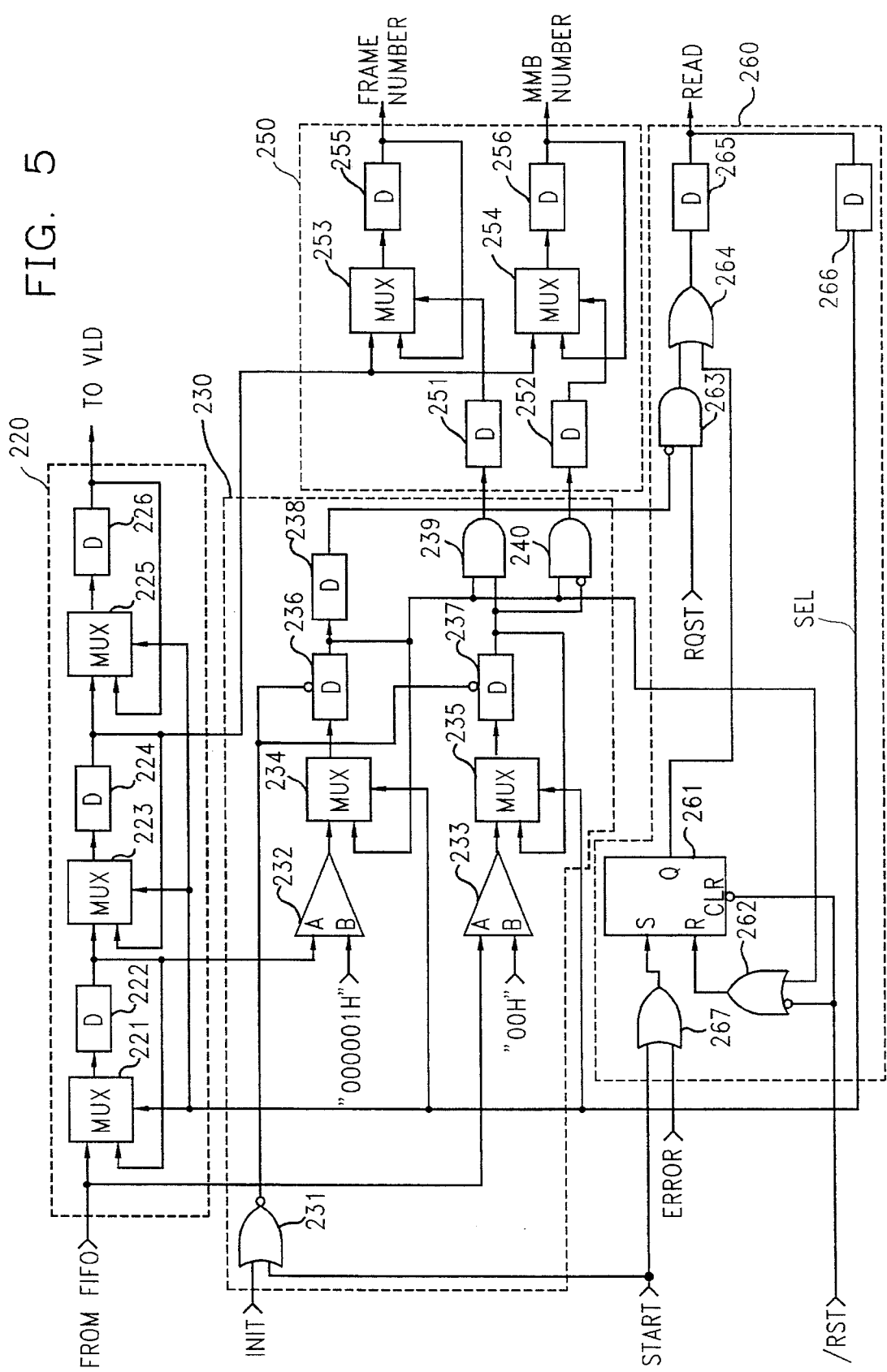
FIG. 5 is a detailed circuit diagram of a variable-length-decoder (VLD) interfacer shown in FIG. 3.

As shown in FIG. 5, VLD interfacer 200 includes a data latch 220, an FSC/MSC (frame start code/MMB start code) detector 230, a number outputter 250 and a control signal generator 260. Firstly, controller 500 generates a start signal START of FIG. 4B on the basis of a predefined bitstream standard. The signal START generated by controller 500 is applied to FSC/MSC detector 230 and control signal generator 260. Flip-flops 236 and 237 of FSC/MSC detector 230 are cleared so that the output values become "0" by low-level pulses applied to reset ends via a NOR gate 231. When a first high-level pulse of signal START shown in FIG. 4B is applied to control signal generator 260, an RS flip-flop 261 in control signal generator 260 is cleared by a reset signal /RST, and outputs a binary value of "1" via an output end Q in response to a start signal START applied to an input end S. Flip-flop 265 latches a binary value of "1" applied from RS flip-flop 261 via an OR gate 264. The binary value of "1" latched in flip-flop 265 is output to FIFO memory 100 and flip-flop 266. The binary value of "1" output from flip-flop 265 is used as read signal READ for FIFO memory 100. The output of flip-flop 266 is used as select signals SEL for controlling multiplexers 221, 223, 225, 234 and 235. FIFO memory 100 outputs the stored data to VLD interfacer 200 24-bit by 24-bit in response to read signal READ supplied from VLD interfacer 200. The 24-bit data supplied from FIFO memory 100 is applied to data latch 220, flip-flops 222, 224 and 226 latches the supplied data by 24 bits sequentially. FSC/MSC detector 230 detects a frame start code or an MMB start code from the output data of flip-flop 222 and the data applied to multiplexer 221. In more detail, comparator 232 compares the output data of flip-flop 222 with an MMB start code of "000001H." If both are same, a binary value of "1" is output, while if both are different from each other, a binary value of "0" is output. Comparator 233 compares "00H" being a part of the frame start code "00000100H" with the data applied to multiplexer 221. If the frame start code is detected, both comparators 232 and 233 output binary values of "1." On the other hand, if the MMB start code is detected, only comparator 232 output a binary value of "1." If the frame start code or the MMB start code is detected, RS flip-flop 261 is reset. Accordingly, control signal generator 260 does not generate read signal READ any more. Thus, VLD interfacer 200 can automatically remove the "0" bit stuffed data contained in the frame head data FRMH or MMB head data MMBH.

When the frame start code is detected by FSC/MSC detector 230, the frame number following the frame start code is latched in flip-flop 255 in number outputter 250. By the detection of the frame start code, a binary value of "1" output from comparator 232 is applied to reset end R of RS flip-flop 231 in control signal generator 260 after being logically summed in an OR gate 262 via multiplexer 234 and flip-flop 236. RS flip-flop 261 outputs a binary value of "0" via output end Q in response thereto. As a result, since RS flip-flop 261 outputs a binary value of "0," control signal generator 260 ceases to generate read signal READ after a delay time for RS flip-flop 261 and flip-flop 265 have elapsed.

On the other hand, controller 500 supplies a second high-level pulse shown in FIG. 4B to the FIG. 5 apparatus, if the 72-bit data is latched in data latch 200. Since RS flip-flop again outputs a binary value of "1" because of the second high-level pulse of start signal START, control signal generator 260 generates read signal READ until new 72-bit data is latched in data latch 220. By this read signal READ, head data MMBH1 of the MMB1 shown in FIG. 4A is latched in data latch 220. In this case, the MMB start code is detected by comparators 232 and 233 in FSC/MSC detector 230, and flip-flop 236 latches a binary value of "1." RS flip-flop 261 in control signal generator 260 outputs a binary value of "0" according to a binary value of "1" latched in flip-flop 236 via output end Q. Also, the MMB number following the MMB start code is latched in flip-flop 256 in number outputter 250. If the head data MMBH1 of the MMB1 shown in FIG. 4A is latched in data latch 220, controller 500 supplies the first high-level pulse of the initialization signal INIT of FIG. 4C to flip-flop 236 in FSC/MSC detector 230. Flip-flop 236 is cleared by the initialization signal applied to its clear input. Thereafter, since the data applied to comparator 232 from flip-flop 222 does not include the same data as the MMB start code, a binary value of "0" is applied to AND gate 263 until part of the MMB start code or the frame start code of the MMB2 is detected. As a result, control signal generator 260 generates a read signal READ according to data request signal RQST supplied from variable-length-decoder 300.

If VLD interfacer 200 supplies the latched data to variable-length-decoder 300, variable-length-decoder variablelength-decodes the supplied data. In more detail, variable-length-decoder 300 detects a run-level pair corresponding to the variable-length codeword, sequentially outputs "0" the number of times indicated by the run-length of the run-level pair, and then outputs the level of the run-level pair. Variable-length-decoder 300 generates data request signal RQST whenever the number of bits of the variable-length-decoded data reaches a predetermined number of bits, and outputs the generated data request signal to VLD interfacer 200. By repeating this operation, information data MMBD1 of the MMB1 is variable-length-decoded by variable-length-decoder 300. Variable-length-decoder 300 outputs the EOB code of each block obtained by the variable-length-decoding operation to an error detector 400. Error detector 400 judges whether the EOB code is obtained exactly at the decoding time of the EOB code. When a transmission error is not included in the bitstream, it is judged that the EOB code applied from variable-length-decoder 300 is decoded exactly at the decoding time by error detector 400. In this case, since error signal ERROR is not supplied to VLD interfacer 200 and controller 500, the FIG. 3 apparatus performs a variable-length-decoding operation normally on the basis of the data supplied from FIFO memory 100. After the data of the MMB1 is completely supplied to VLD interfacer 200, if data of the MMB2 is supplied to VLD interfacer 200, FSC/MSC detector 230 in VLD interfacer 200 detects the MMB start code of the MMB2. Then, controller 500 supplies the second high-level pulse of initialization signal INIT shown in FIG. 4C if the MMBH2 of the MMB2 is latched in data latch 220. The data supplied to VLD interfacer 200 is supplied to variable-length-decoder 300 according to the procedures described above, and is variable-length-decoded by variable-length-decoder 300.

When the data supplied to variable-length-decoder 300 from VLD interfacer 200 contains a transmission error, the data is not exactly variable-length-decoded. The EOB codes generated in this case are counted by error detector 300. An example of the error interval of a bitstream including a transmission error is shown in FIG. 4D. Error detector 400 generates error signal ERROR if the number of the counted EOB codes becomes not less than a predetermined limit value. Here, the limit value is properly selected on the basis of the amount of data which can be hidden by an error concealment portion (not shown). The generated error signal ERROR is supplied to VLD interfacer 200, controller 500 and the error concealment portion (not shown). If the error signal ERROR shown in FIG. 4E is applied to VLD interfacer 200 from error detector 400, OR gate 267 supplies a high-level pulse of error signal ERROR of FIG. 4E to input end S of RS flip-flop 261. RS flip-flop 261 outputs a binary value of "1" in response to the input high-level pulse. RS flip-flop 261 continuously maintains the binary value of "1" until a binary value of "1" is applied from flip-flop 236 via OR gate 262. On the other hand, when error signal ERROR as shown in FIG. 4E is applied to controller 500, controller 500 controls variable-length-decoder 300 to stop the decoding operation. Thus, although the data from FIFO memory 100 is supplied via VLD interfacer 200, variable-length-decoder 300 does not decode the input data, and does not generate data request signal RQST. In this case, read signal READ generated by control signal generator 260 is based on the output of RS flip-flop 261, and is generated for a shorter period of time than read signal READ based on data request signal RQST. This results from the fact that variable-length-decoder 300 generates data request signal RQST based on the number of bits used for the decoding operation, while read signal READ generated by RS flip-flop 261 is generated on the basis of a clock pulse (not shown) for operating the FIG. 5 apparatus. When a MMB1 includes the transmission error, the data supplied from VLD interfacer 200 to variable-length-decoder 300 is shown in FIG. 4F. VLD interfacer 200 continuously generates read signal READ until head data MMBH2 of the MMB2 is supplied from FIFO memory 100 and reads data from FIFO memory 100. If head data MMBH2 of the MMB2 just following the MMB1 is supplied to VLD interfacer 200, comparator 232 outputs a binary value of "1." The binary value of "1" is applied to RS flip-flop 261 via flip-flop 236 and OR gate 262. As a result, RS flip-flop 261 outputs a binary value of "0," and flip-flop 265 ceases generating read signal READ. Thus, VLD interfacer 200 latches the data of the previous stage of the MMB2 until the second high-level pulse of the initialization signal INIT shown in FIG. 4C is applied from controller 500. On the other hand, controller 500 controls variable-length-decoder 300 to resume the decoding operation at the time when the second high-level pulse of initialization signal INIT is applied to VLD interfacer 200. In this manner, the FIG. 3 apparatus does not variable-length-decode the data in the respective MMBs which include a transmission error, but instead maintains synchronization with respect to the following MMB.

As described above, the sync restoring apparatus of the present invention forcibly performs a reading operation of data in a MMB which includes a transmission error until the head data of the following MMB is read from FIFO memory 100. This is a period during which variable-length-decoding is not normally performed due to the transmission error. Accordingly, a normal variable-length-decoding operation can be performed from the following MMB and synchronization for signal processing can be maintained as well.

While only certain embodiments of the invention have been specifically described herein, it will apparent that numerous modifications may be made thereto without departing from the spirit and scope of the invention.

What is claimed is:

1. A sync restoring apparatus for receiving variable-length-coded data on the basis of a data format including a block end signal representing a first block having a predetermined magnitude and a second block larger than the first block, and variable-length-decoding the received data, said sync restoring apparatus comprising:

a first-in-first-out (FIFO) memory for storing the received variable-length-coded data and sequentially outputting a predetermined number of bits of data from firstly stored data every time a read signal is applied to the FIFO memory;

a variable-length-decoder for performing a variable-length-decoding operation on data output from said FIFO memory, outputting the block end signal obtained by the variable-length-decoding operation, and generating a data request signal every time a number of bits of data used in the variable-length-decoding operation becomes a predetermined number;

an error detector for judging whether the block end signal output from the variable-length-decoder is decoded at an exact variable-length-decoding time based on a data format, and generating an error signal when a number of the block end signals which are not decoded at the exact variable-length-decoding time obtained by the judged result is equal to or larger than a predetermined limit value;

an interfacer coupled to transmit the data output from the FIFO memory to the variable-length-decoder according to the read signal, and if the error signal is not generated in the error detector, applying a read signal to the FIFO memory according to the data request signal generated from the variable-length-decoder, while if the error signal is generated in the error detector, applying read signals to the FIFO memory until error-detected second block data is wholly read from the FIFO memory, independently of the data request signal; and a controller for controlling the variable-length-decoder so as to stop the decoding operation of the variable-length-decoder when the error signal output from the error detector is applied to the controller, while when the second block data following the error-detected second block is supplied to the variable-length-decoder, the decoding operation is performed.

2. The sync restoring apparatus according to claim 1, wherein said error detector compares a number of the block end signals obtained every second block.

3. The sync restoring apparatus according to claim 1, wherein said interfacer generates read signals having a smaller interval of time than those of the read signals generated according to the data request signals when the error signal is applied to the interfacer.

4. A sync restoring method for an apparatus for storing variable-length-coded data on the basis of a data format including a block end signal representing a first block having a respectively predetermined magnitude and a second block larger than the first block, and decoding data supplied from a first-in-first-out (FIFO) memory which sequentially outputs a predetermined number of bits of data from firstly stored data every time a read signal is applied to the FIFO memory, said sync restoring method comprising the steps of:

(a) variable-length-decoding the data supplied from the FIFO memory, outputting the block end signal obtained by the variable-length-decoding operation, and generating a data request signal every time the number of bits of the data used in the variable-length-decoding operation becomes a predetermined number;

(b) judging whether the block end signal output from said step (a) is decoded at an exact variable-length-decoding time based on the data format;

(c) generating an error signal when a number of the block end signals which are not decoded at the exact variable-length-decoding time obtained by a judged result of said step (b) is equal to our larger than a predetermined limit value;

(d) if the error signal is not generated in said step (c), generating a read signal according to the data request signal generated in said step (a);

(e) if the error signal is generated in said step (c), generating read signals until error-detected second block data is wholly read from the FIFO memory, independently of the data request signal; and (f) controlling said step (a) so that second block data corresponding to the error signal of said step (c) is not variable-length-decoded by said step (a) and second block data following the error-detected second block is variable-length-decoded.

5. The sync restoring method according to claim 4, wherein said step (c) compares a number of the block end signals obtained every second block.

6. The sync restoring method according to claim 4, wherein said step (e) generates read signals having a smaller interval of time than that of the read signals generated according to the data request signals when the error signal is generated in said step (c).

* * * * *